W. J. BOLL.
LAWN MOWER ATTACHMENT.
APPLICATION FILED SEPT. 16, 1920.

1,388,794.

Patented Aug. 23, 1921.

WITNESSES
Geo. W. Naylor
Franklin J. Foster

INVENTOR
W. J. Boll
BY Munn & Co.
ATTORNEYS

UNITED STATES PATENT OFFICE.

WILLIAM J. BOLL, OF PLATTEVILLE, WISCONSIN.

LAWN-MOWER ATTACHMENT.

1,388,794.   Specification of Letters Patent.   Patented Aug. 23, 1921.

Application filed September 16, 1920. Serial No. 410,763.

*To all whom it may concern:*

Be it known that I, WILLIAM J. BOLL, a citizen of the United States, and a resident of Platteville, county of Grant, and State of Wisconsin, have invented a new and Improved Lawn-Mower Attachment, of which the following is a full, clear, and exact description.

This invention relates to improvements in blade adjusting mechanisms for lawn mowers, particularly those types of lawn mowers which employ series of rotary blades coöperating with a fixed blade to sever the grass. An object of the invention is to provide improved means for adjusting the position of the fixed blade.

A further object is to provide a blade adjusting mechanism, which will be practical and simple in construction and adapted for use with many mowers now on the market and at the same time provide a device, which will be strong and durable and which will not greatly increase the selling price of the mower.

With these and other objects in view, the invention consists in certain novel features of construction and combination and arrangements of parts, as will be more fully hereinafter described and pointed out in the claim.

Figure 1:
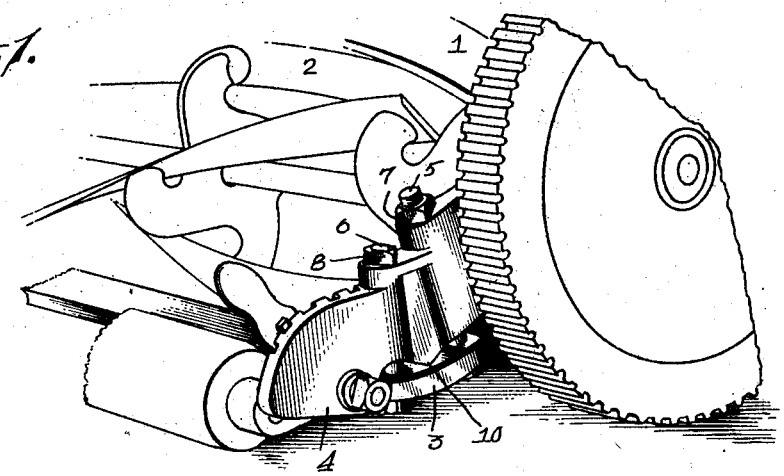
Figure 1 is a fragmentary perspective view of a lawn mower with my improved blade adjusting mechanism attached.

Referring in detail to the drawings, 1 represents a well known type of lawn mower, wherein a series of rotary blades 2, coöperate with a fixed blade 3, to cut the grass. A pair of rearwardly projecting frame members 4, secured to the wheel axles of the mower provide mounting for the rotary blades 2.

The frames 4 also carry the fixed blade 3. It often becomes necessary due to the wear on the blades to adjust the fixed blades, relative to the rotary blades; the invention resides in novel means of those adjustments.

Each frame member 4 is bored to accommodate a pair of screws 5 and 6, and the fixed blade 3 is also bored to accommodate the screws and is supported below the frames by the screws 5 and 6. It will be noticed as shown clearly at 12 in Fig. 2 that the diameter of the screws is substantially less than the internal diameter of the screw receiving perforations in the fixed blade 3. The purpose of this feature of construction will hereinafter appear. Nuts 7 and 8 are screwed onto the upper threaded ends 9 of the screws 5 and 6.

The screws are disposed relative to each other with their upper threaded ends close together and their lower headed ends at some distance apart.

The frames 4 are provided with downwardly extending angular shoulders 10, between the screws. When the nuts 7 and 8 are screwed home, the upper face of the fixed blade 3 is held against the two angular shoulders 10. It will thus be seen by adjusting the screws, the blade will fulcrum on the shoulders 10 to raise or lower the forward cutting edge 13 of the blade.

For convenience in applying a wrench to turn the nuts, shoulders 11 are formed in the upper edge of the frame 4, so that the nuts may be conveniently independently operated.

Figure 2:
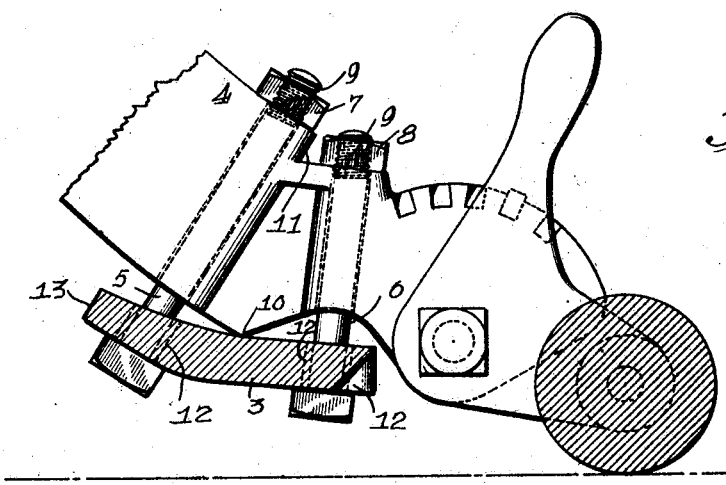
Fig. 2 is an enlarged view in section on the line 2—2 of Fig. 3.
Figure 3:
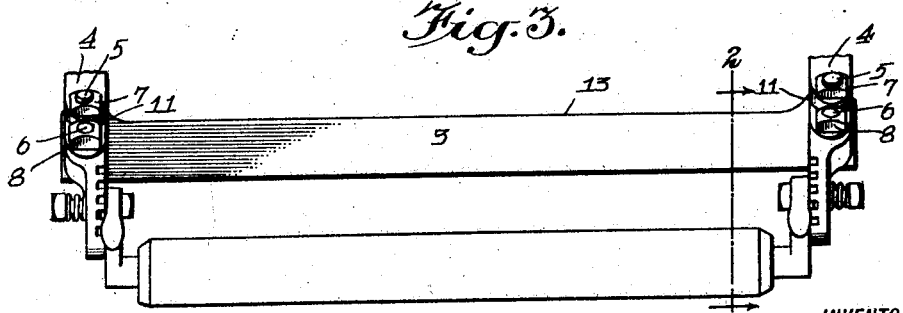
Fig. 3 is a top plan view of the fixed blade and its associated parts.

The operation will be readily understood; to raise the forward edge of the blade 3 from the position shown in Figs. 1 and 2, it is merely necessary to loosen the nuts 8 and tighten the nuts 7. The blade 3 fulcruming on the shoulders 10, and moving into closer engagement with the rotary blades 2. The screws 5 and 6 are only movable longitudinally in the frames 4, but the size of the screw receiving openings in the blade 3 allows for a slight lateral movement of the blade relative to the screws, so that the blade may fulcrum on the shoulders 10.

While I have illustrated one of the preferred embodiments of my invention, it is apparent that various slight changes and alterations might be made and therefore I do not limit myself to the precise construction shown, as variations may be made therefrom without departing from the spirit of my invention.

I claim:

A blade adjusting attachment for lawn mowers comprising a pair of blade carrying frames, an angular shoulder presented downwardly from each frame, a blade, screws passed upwardly through the blade and entirely through the frames and holding the blades against the shoulders, said screws movable longitudinally in the frames, nuts on the upper ends of the screws engaging the upper face of the frame and controlling the position of the blade relative to the frame.

WILLIAM J. BOLL.